(12) United States Patent
Cho

(10) Patent No.: US 9,240,699 B2
(45) Date of Patent: Jan. 19, 2016

(54) POWER SUPPLY APPARATUS AND POWER SUPPLY APPARATUS FOR ELECTRIC VEHICLE

(71) Applicant: SAMSUNG ELECTRO-MECHANICS CO., LTD., Suwon, Gyunggi-do (KR)

(72) Inventor: Won Jin Cho, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 360 days.

(21) Appl. No.: 13/735,682

(22) Filed: Jan. 7, 2013

(65) Prior Publication Data
US 2014/0117937 A1 May 1, 2014

(30) Foreign Application Priority Data
Oct. 29, 2012 (KR) .................. 10-2012-0120729

(51) Int. Cl.
| | |
|---|---|
| *H02J 7/00* | (2006.01) |
| *B60L 11/18* | (2006.01) |
| *B60L 15/00* | (2006.01) |
| *H02J 7/02* | (2006.01) |

(52) U.S. Cl.
CPC ........... *H02J 7/0068* (2013.01); *B60L 11/1812* (2013.01); *B60L 11/1816* (2013.01); *B60L 15/007* (2013.01); *B60L 2210/30* (2013.01); *H02J 7/022* (2013.01)

(58) Field of Classification Search
CPC ....... H02J 7/0068; H02J 7/022; H02J 7/0062; B60L 11/1811
USPC ......... 320/103, 104, 109, 121, 128, 135, 138; 180/65.1, 65.21
See application file for complete search history.

(56) References Cited

U.S. PATENT DOCUMENTS

| | | | | |
|---|---|---|---|---|
| 5,793,189 | A * | 8/1998 | Kawaguchi ......... | B60L 11/1859 320/125 |
| 2008/0174276 | A1* | 7/2008 | Takahashi ............... | H02J 9/061 320/128 |
| 2011/0260690 | A1* | 10/2011 | Kojori ....................... | H02J 3/32 320/134 |
| 2011/0298414 | A1* | 12/2011 | Manor .................. | H02J 7/0054 320/103 |
| 2012/0049794 | A1* | 3/2012 | Han ....................... | B60L 1/003 320/109 |
| 2012/0123625 | A1* | 5/2012 | Ueo ........................ | B60L 3/003 701/22 |

FOREIGN PATENT DOCUMENTS

| | | |
|---|---|---|
| JP | 2012-152035 A | 8/2012 |
| KR | 2011-0094634 A | 8/2011 |

\* cited by examiner

*Primary Examiner* — Samuel Berhanu
*Assistant Examiner* — Tessema Kebede
(74) *Attorney, Agent, or Firm* — McDermott Will & Emery LLP

(57) ABSTRACT

There are provided an all-in-one power supply apparatus capable of concurrently supplying battery charging power and main power, in particular, main power for driving an electric vehicle, and a power supply apparatus for an electric vehicle. The power supply apparatus and the power supply apparatus for an electric vehicle respectively including: a charging unit; a main power supplying unit; and an auxiliary power supplying unit.

12 Claims, 3 Drawing Sheets

POWER SUPPLY APPARATUS AND POWER SUPPLY APPARATUS FOR ELECTRIC VEHICLE

CROSS-REFERENCE TO RELATED APPLICATIONS

This application claims the priority of Korean Patent Application No. 10-2012-0120729 filed on Oct. 29, 2012, in the Korean Intellectual Property Office, the disclosure of which is incorporated herein by reference.

BACKGROUND OF THE INVENTION

1. Field of the Invention

The present invention relates to a power supply apparatus capable of bidirectionally supplying power, and more particularly, to a power supply apparatus for an electric vehicle.

2. Description of the Related Art

Demand for vehicles is explosively increasing in accordance with economic progress. Because of the increase in demand for vehicles and use thereof, vehicle exhaust emissions are main causes of environmental pollution.

In this regard, the need for reductions in vehicle exhaust emissions has continued, and so research into and development of methods of reducing vehicle exhaust emissions have been conducted. Furthermore, attempts to commercialize electric vehicles that do not emit exhaust gasses have been partially made.

Electric vehicles are vehicles that operate using electricity as a motive power source, have a rechargeable battery mounted therein as the power supply, and operate by using power supplied from the mounted battery.

Such electric vehicles generally include an electric motor driven by electricity and used as a power source for operating electric vehicles instead of an internal combustion engine, and a battery supplying electricity to the electric motor in order to drive the electric motor.

Recently, a plug-in charging method has mainly been used and developed so as to supply electricity to a battery and allow the battery to be charged. The plug-in charging method is a method of supplying power to the battery for the charging thereof through a plug-in charging apparatus and operating electric vehicles by using the battery.

The charging of an electric vehicle battery using the plug-in charging method requires a relatively long period of time and a vehicle may have limited mileage with one battery charge. It generally takes about 1-8 hours to charge electric vehicles, leading to a defect in that it may be difficult to safely manage electric vehicles during such a long charging period of time.

Therefore, electric vehicles should be frequently charged so as to secure a target moving distance, and thus, building charging stations and charging systems are very important in operating electric vehicles.

Further, electric vehicles should be charged without being influenced by external environmental conditions such as rain, snow, and the like, during charging. Furthermore, in a case in which the charging system of electric vehicles is constructed in the same manner as current gas stations, it is impossible to meet charging demand.

As described above, the necessity of establishing a charging system suitable for electric vehicles is emerging as a major issue in the commercialization of electric vehicles.

As the charging system of electric vehicles, a bidirectional charging apparatus for supplying power during electrical charging at a charging station and supplying power from a battery after charging is complete is disclosed in the prior art document. However, there is a limitation in that a circuit area and manufacturing costs may be increased due to the weight and volume of a transformer that is a core element in the bidirectional charging apparatus. Further, circuits for supplying power to electric vehicles are additionally necessary, which also further increases circuit area and manufacturing costs.

RELATED ART DOCUMENT (Patent Document 1) Korean Patent Laid-Open Publication No. 10-2011-0094634

SUMMARY OF THE INVENTION

An aspect of the present invention provides an all-in-one power supply apparatus capable of concurrently supplying battery charging power and main power, in particular, main power for driving an electric vehicle, and a power supply apparatus for an electric vehicle.

According to an aspect of the present invention, there is provided a power supply apparatus including: a charging unit charging a battery with charging power by converting input power into the charging power having a predetermined level and after the charging is completed, supplying the charged power from the battery; a main power supplying unit converting the input power into main power having a predetermined level to supply the main power during the charging of the battery by the charging unit, and after the charging of the battery by the charging unit is completed, converting the charged power from the charging unit into the main power to supply the main power; and an auxiliary power supplying unit stopping a power supply during the charging of the battery by the charging unit, and after the charging of the battery by the charging unit is completed, converting the charged power from the charging unit into auxiliary power having a predetermined level to supply the auxiliary power.

The charging unit may include a bidirectional power converting unit supplying the battery with the charging power by switching and converting the input power into the charging power, and supplying the charged power from the battery to the main power supplying unit and the auxiliary power supplying unit.

The charging unit may include: a rectifying unit rectifying alternating current (AC) power; and a power factor correcting unit correcting a power factor of the rectified power and supplying the power factor corrected power to the bidirectional power converting unit.

The bidirectional power converting unit may include: a first switching unit switching the input power during the charging of the battery, and after the charging of the battery is completed, rectifying and supplying the charged power; a second switching unit rectifying the power switched by the first switching unit to supply the charging power to the battery during the charging of the battery, and after the charging of the battery is completed, switching the charged power from the battery and transferring the switched power to the first switching unit; and a transformer bidirectionally transferring the power to the first switching unit and the second switching unit with a predetermined turns ratio.

The main power supplying unit may include: a power switch switching the input power or the charged power; a transformer changing a voltage level of the power switched by the power switch according to a predetermined turns ratio; and a stabilization unit stabilizing the power from the transformer to output the main power.

The auxiliary power supplying unit may include: a path switch switching a power transfer path according to the charging of the battery by the charging unit or supplying of the charged power; a power switch switching power input to the power transfer path; and a stabilizing circuit stabilizing the power switched by the power switch.

According to another aspect of the present invention, there is provided a power supply apparatus for an electric vehicle, the power supply apparatus including: a charging unit charging a battery with charging power by converting input power for charging an electric vehicle into the charging power having a predetermined level and after the charging is completed, supplying the charged power from the battery; a main power supplying unit converting the input power into main power having a predetermined level and required for a normal driving of the electric vehicle to supply the main power during the charging of the battery by the charging unit, and after the charging of the battery by the charging unit is completed, converting the charged power from the charging unit into the main power to supply the main power; and an auxiliary power supplying unit stopping a power supply during the charging of the battery by the charging unit, and after the charging of the battery by the charging unit is completed, converting the charged power from the charging unit into auxiliary power having a predetermined level to supply the auxiliary power.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
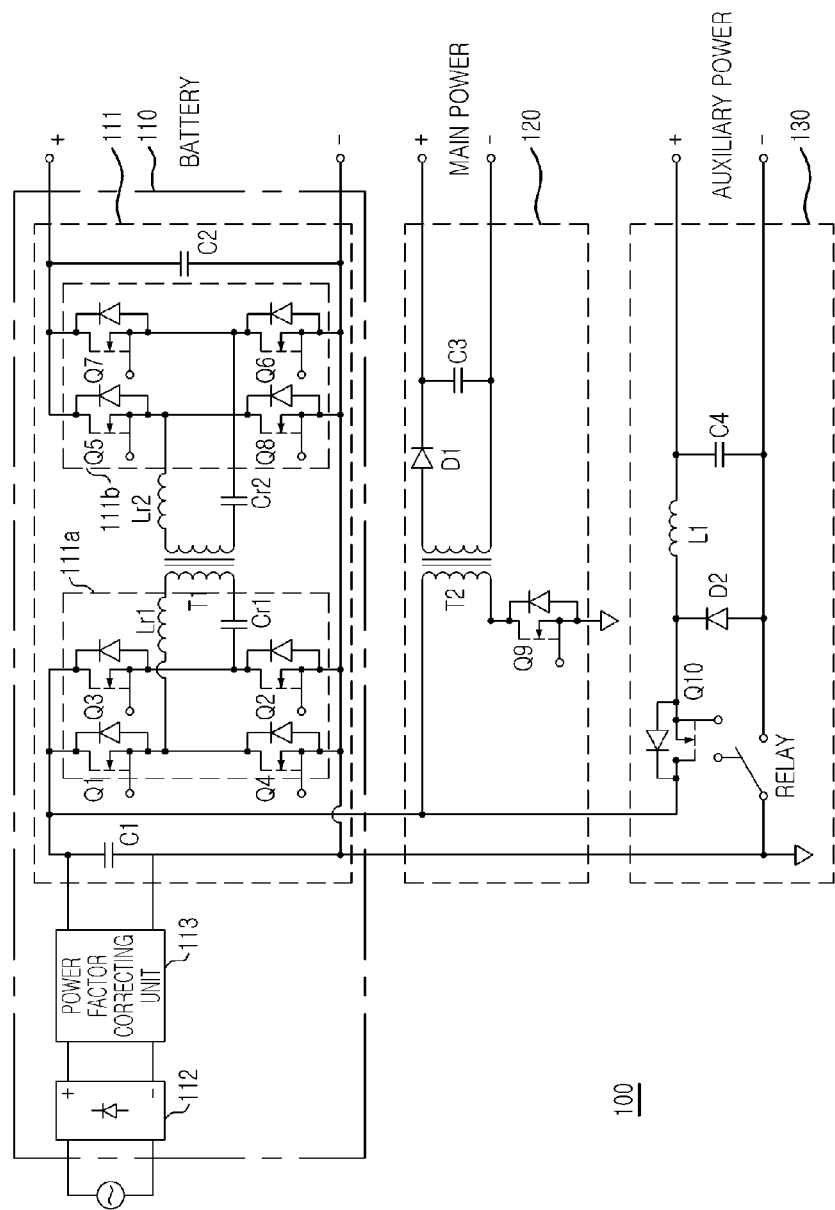
FIG. 1 is a schematic circuit diagram of a power supply apparatus according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a schematic circuit diagram of a power supply apparatus 100 according to an embodiment of the present invention.

Referring to FIG. 1, the power supply apparatus 100 of the embodiment of the present invention may include a charging unit 110, a main power supplying unit 120, and an auxiliary power supplying unit 130.

The charging unit 110 may include a bidirectional power converting unit 111, a rectifying unit 112, and a power factor correcting unit 113.

The rectifying unit 112 may rectify alternating current (AC) power and supply the rectified power to the power factor correcting unit 113. The power factor correcting unit 113 may correct a phase difference between voltage and current of the supplied power and supplying the corrected power to the bidirectional power converting unit 111.

The bidirectional power converting unit 111 may include a first switching unit 111a, a second switching unit 111b, and a transformer T1.

The first switching unit 111a may include full bridge switches Q1, Q2, Q3, and Q4 as shown in FIG. 1. Although not shown, the first switching unit 111a may include various switches such as half bridge switches or push-pull switches, or the like.

The first switching unit 111a may alternatively switch the power input thereto (the input power may be charged in a capacitor C1 to be stabilized) from the power factor correcting unit 113 through the full bridge switches Q1, Q2, Q3, and Q4 and transfer the power to the transformer T1. In addition, the first switching unit 111a may rectify power from the transformer T1 and supply the rectified power to the main power supplying unit 120 and the auxiliary power supplying unit 130.

In this regard, the above-described power rectification operation may be performed by a body diode of the full bridge switches Q1, Q2, Q3, and Q4.

The transformer T1 may form a predetermined turns ratio. To this end, the transformer T1 may have a primary winding and a secondary winding predetermined turn amounts. The primary winding may be connected to the first switching unit 111a. The primary winding and the secondary winding may be insulated from each other. The secondary winding may be connected to the second switching unit 112b.

Accordingly, the transformer T1 may vary a voltage level of power switched by the first switching unit 111a according to the turns ratio and transfer the varied power to the second switching unit 111b. Likewise, the transformer T1 may vary a voltage level of power switched by the second switching unit 111b according to the turns ratio and transfer the varied power to the first switching unit 111a.

The above-described bidirectional power transfer operations may be alternately performed. The alternate operations may be determined by the supplying of the input power and the supplying of charged power from a battery.

The second switching unit 111b may rectify the switched power from the transformer T1 through the body diode of the full bridge switches Q5, Q6, Q7, and Q8 and transfer charging power to the battery (the charging power transferred to the battery may be stabilized by a capacitor C2).

In addition, if charging is complete, the charged power from the battery may be switched by the full bridge switches Q5, Q6, Q7, and Q8 and be supplied to the first switching unit 111a through the transformer T1.

The main power supplying unit 120 may receive the input power from the power factor correcting unit 113, convert the input power into main power having a predetermined voltage level, and supply the main power to an external circuit requiring a supply of the main power. The main power supplying unit 120 may also receive the charged power of the battery from the bidirectional power converting unit 111, convert the charged power into the main power, and supply the main power to the external circuit.

The main power supplying unit 120 may include a transformer T2, a power switch Q9, and stabilizing circuits D1 and C3.

The power switch Q9 may be connected to one end of a primary winding of the transformer T2 and switch power input to or charged in the transformer T2.

The transformer T2 may have the primary winding and a secondary winding having a predetermined turns ratio. The secondary winding may change a voltage level of power switched by a switching operation of the power switch Q9 according to the turns ratio and output the changed power.

The stabilizing circuits D1 and C3 may include a diode D1 and a capacitor C3 to stabilize the power output from the secondary winding of the transformer T2 and output the main power.

Accordingly, the main power supplying unit 120 may supply the main power all the time.

The auxiliary power supplying unit 130 may include a path switch, a power switch Q10, and stabilizing circuits D2, L1, and C4.

The path switch may open or block a path through which power is transferred. Although the path switch may include a relay to handle a level of the power, the present invention is not limited.

The path switch may block the path during the supplying of the input power, and open the path during the supplying of the charged power.

The power switch Q10 may switch the charged power supplied through the path opened by the path switch and vary a voltage level of the charged power.

The stabilizing circuits D2, L1, C4 may include a diode denoted by D2, an inductor denoted by L1, and a capacitor denoted by C4 to stabilize the power switched by the power switch Q10 and output auxiliary power.

The above-described power supply apparatus 100 may be used in an electric vehicle.

That is, AC power for an electric vehicle may be supplied to the charging unit 110 from a charger for an electric vehicle provided by a charging station or a home appliance, converted into charging power, and charged in a battery for the electric vehicle. In this regard, DC power of which a power factor is corrected by the power factor correcting unit 113 of the charging unit 110 may be supplied to the main power supplying unit 120. The main power from the main power supplying unit 120 may be supplied to an element required for a normal operation of the electric vehicle. However, the main power is not used to operate a motor for driving the electric vehicle.

Figure 2:
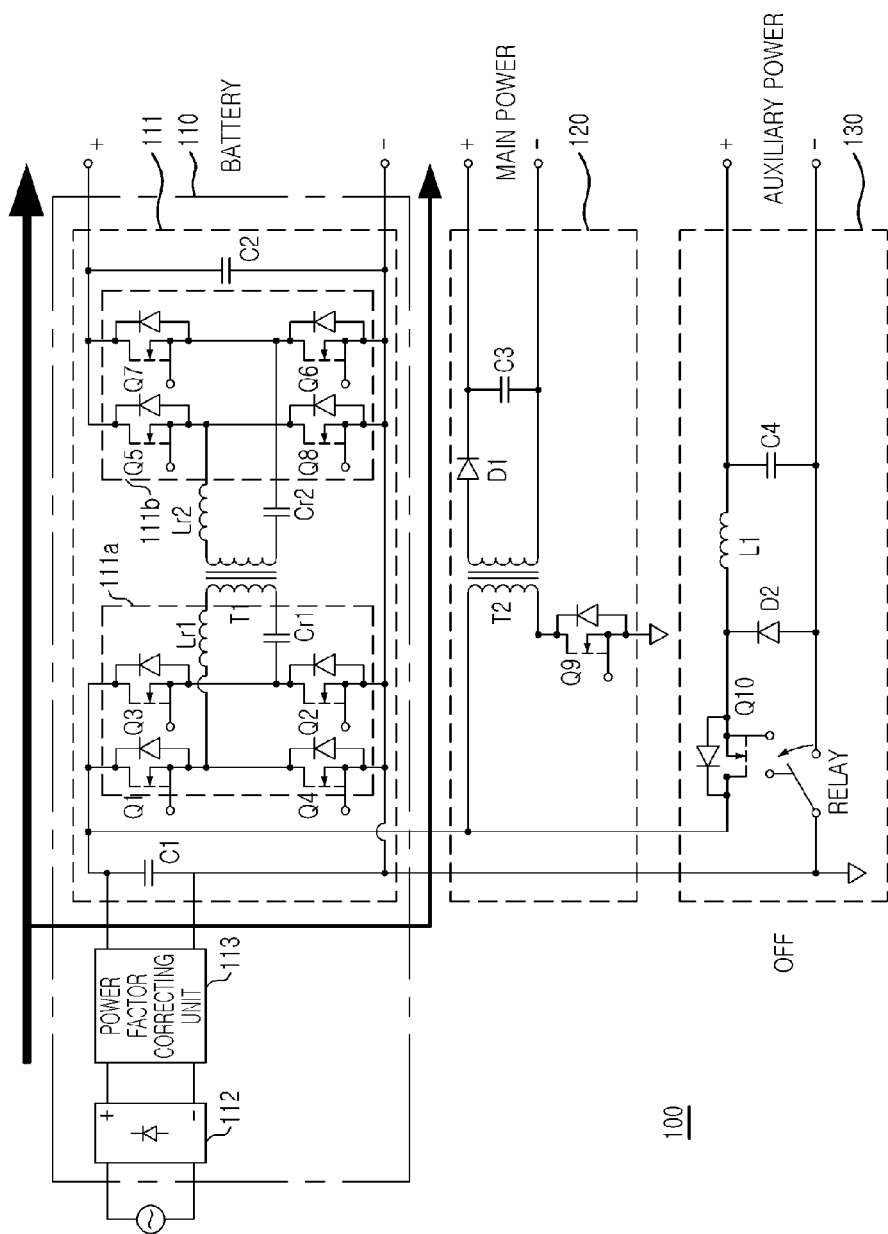
FIGS. 2 and 3 are schematic circuit diagrams of charging paths of the power supply apparatus according to the embodiment of the present invention.
Figure 3:
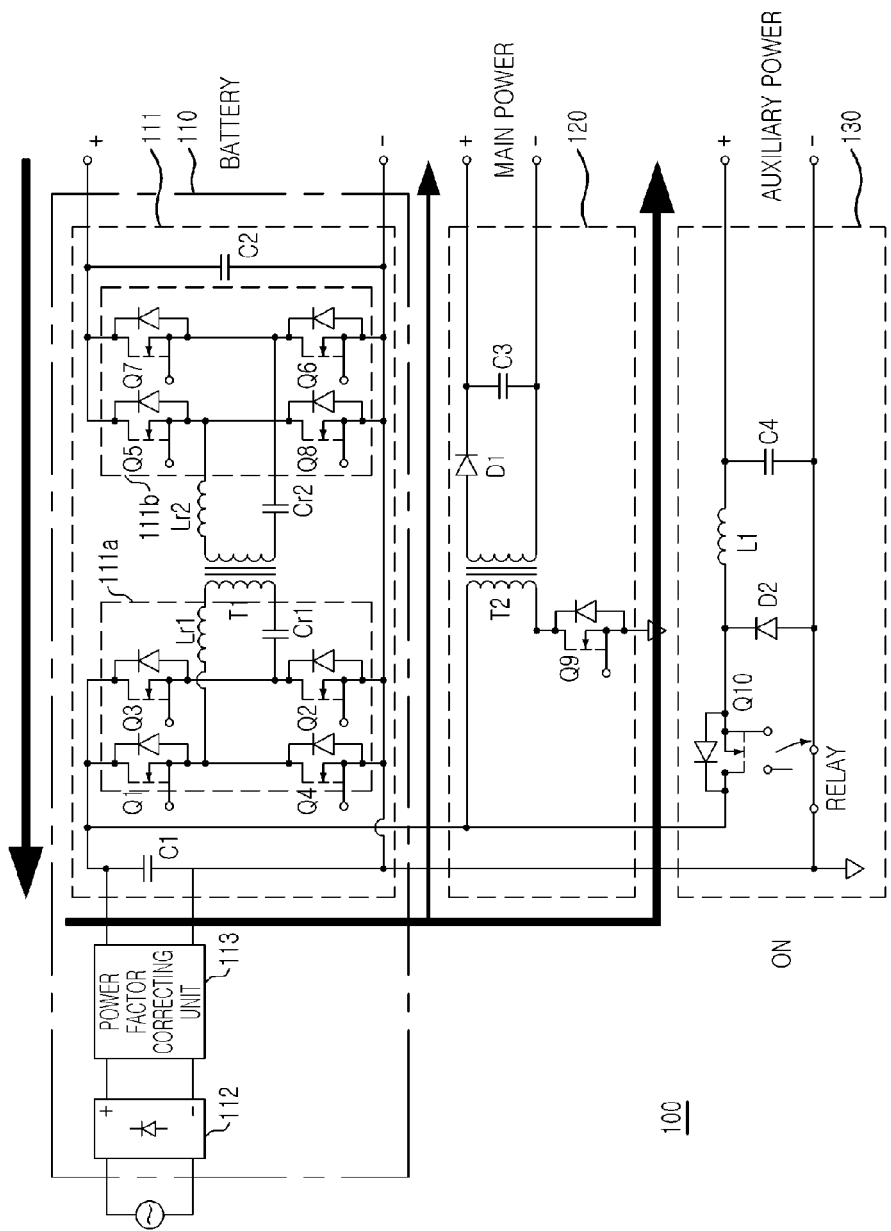

FIGS. 2 and 3 are schematic circuit diagrams of charging paths of the power supply apparatus according to the embodiment of the present invention.

Referring to FIG. 1 and FIG. 2, when AC power for an electric vehicle is input to the rectifying unit 112 of the charging unit 110 from the charger for an electric vehicle, the rectifying unit 112 rectify the AC power and transfer the rectified power to the power factor correcting unit 113. The power factor correcting unit 113 may supply the power of which the power factor is corrected to the bidirectional power converting unit 111 and the main power supplying unit 120. In this case, a power transfer path through which the power having the power factor corrected by the power factor correcting unit 113 may be supplied to the auxiliary power supplying unit 130 is blocked.

The bidirectional power converting unit 111 and the main power supplying unit 120 may respectively supply charging power for charging the battery for an electric vehicle and main power (DC power of about 12 V) supplied to an element requiring a normal power supply of the electric vehicle.

Referring to FIG. 1 and FIG. 3, when the charging of the battery for an electric vehicle is completed and the charger for an electric vehicle and the electric vehicle are disconnected from each other, the charged power from the battery for an electric vehicle may be supplied to the main power supplying unit 120 and the auxiliary power supplying unit 130 requiring the normal power supply through the bidirectional power converting unit 111. In this case, the path switch of the auxiliary power supplying unit 130 may open the power transfer path, such that the auxiliary power supplying unit 130 may be supplied with the power from the bidirectional power converting unit 111. Accordingly, the main power supplying unit 120 and the auxiliary power supplying unit 130 may respectively supply the main power and auxiliary power to elements requiring electric vehicle power.

As set forth above, according to embodiments of the invention, battery charging power and main power, in particular, main power for driving an electric vehicle can be concurrently supplied, thereby reducing a circuit area and manufacturing costs.

While the present invention has been shown and described in connection with the embodiments, it will be apparent to those skilled in the art that modifications and variations can be made without departing from the spirit and scope of the invention as defined by the appended claims.

What is claimed is:

1. A power supply apparatus comprising:
   a charging unit charging a battery with charging power by converting input power into the charging power having a predetermined level and after the charging is completed, supplying the charged power from the battery;
   a main power supplying unit converting the input power into main power having a predetermined level to supply the main power to a load during the charging of the battery by the charging unit, and after the charging of the battery by the charging unit is completed, converting the charged power from the charging unit into the main power to supply the main power to the load; and
   an auxiliary power supplying unit not receiving a power supply during the charging of the battery by the charging unit, and after the charging of the battery by the charging unit is completed, converting the charged power from the charging unit into auxiliary power having a predetermined level to supply the auxiliary power to another load.

2. The power supply apparatus of claim 1, wherein the charging unit includes a bidirectional power converting unit supplying the battery with the charging power by switching and converting the input power into the charging power, and supplying the charged power from the battery to the main power supplying unit and the auxiliary power supplying unit.

3. The power supply apparatus of claim 2, wherein the charging unit includes:
   a rectifying unit rectifying alternating current (AC) power; and
   a power factor correcting unit correcting a power factor of the rectified power and supplying the power factor corrected power to the bidirectional power converting unit.

4. The power supply apparatus of claim 2, wherein the bidirectional power converting unit includes:
   a first switching unit switching the input power during the charging of the battery, and after the charging of the battery is completed, rectifying and supplying the charged power;
   a second switching unit rectifying the power switched by the first switching unit to supply the charging power to the battery during the charging of the battery, and after the charging of the battery is completed, switching the charged power from the battery and transferring the switched power to the first switching unit; and
   a transformer bidirectionally transferring the power to the first switching unit and the second switching unit with a predetermined turns ratio.

5. The power supply apparatus of claim 1, wherein the main power supplying unit includes:

a power switch switching the input power or the charged power;

a transformer changing a voltage level of the power switched by the power switch according to a predetermined turns ratio; and a stabilization unit stabilizing the power from the transformer to output the main power.

6. The power supply apparatus of claim 1, wherein the auxiliary power supplying unit includes:

a path switch switching a power transfer path according to the charging of the battery by the charging unit or supplying of the charged power;

a power switch switching power input to the power transfer path; and a stabilizing circuit stabilizing the power switched by the power switch.

7. A power supply apparatus for an electric vehicle, the power supply apparatus comprising:

a charging unit charging a battery with charging power by converting input power for charging an electric vehicle into the charging power having a predetermined level and after the charging is completed, supplying the charged power from the battery;

a main power supplying unit converting the input power into main power having a predetermined level and required for a normal driving of the electric vehicle to supply the main power to an element of the electric vehicle during the charging of the battery by the charging unit, and after the charging of the battery by the charging unit is completed, converting the charged power from the charging unit into the main power to supply the main power to the element of the electric vehicle; and an auxiliary power supplying unit not receiving a power supply during the charging of the battery by the charging unit, and after the charging of the battery by the charging unit is completed, converting the charged power from the charging unit into auxiliary power having a predetermined level to supply the auxiliary power to another element of the electric vehicle.

8. The power supply apparatus of claim 7, wherein the charging unit includes a bidirectional power converting unit supplying the battery with the charging power by switching and converting the input power into the charging power, and supplying the charged power from the battery to the main power supplying unit and the auxiliary power supplying unit.

9. The power supply apparatus of claim 8, wherein the charging unit includes:

a rectifying unit rectifying alternating current (AC) power; and a power factor correcting unit correcting a power factor of the rectified power and supplying the power factor corrected power to the bidirectional power converting unit.

10. The power supply apparatus of claim 8, wherein the bidirectional power converting unit includes:

a first switching unit switching the input power during the charging of the battery, and after the charging of the battery is completed, rectifying and supplying the charged power;

a second switching unit rectifying the power switched by the first switching unit to supply the charging power to the battery during the charging of the battery, and after the charging of the battery is completed, switching the charged power from the battery and transferring the switched power to the first switching unit; and a transformer bidirectionally transferring the power to the first switching unit and the second switching unit with a predetermined turns ratio.

11. The power supply apparatus of claim 7, wherein the main power supplying unit includes:

a power switch switching the input power or the charged power;

a transformer changing a voltage level of the power switched by the power switch according to a predetermined turns ratio; and a stabilization unit stabilizing the power from the transformer to output the main power.

12. The power supply apparatus of claim 7, wherein the auxiliary power supplying unit includes:

a path switch switching a power transfer path according to the charging of the battery by the charging unit or supplying of the charged power;

a power switch switching power input to the power transfer path; and a stabilizing circuit stabilizing the power switched by the power switch.

* * * * *